US011530063B2

(12) United States Patent
Nilsson et al.

(10) Patent No.: US 11,530,063 B2
(45) Date of Patent: Dec. 20, 2022

(54) TENSIONING DEVICE FOR A CHAIN DRIVEN JAW SYSTEM

(71) Applicant: Tetra Laval Holdings & Finance S.A., Pully (CH)

(72) Inventors: Fredrik Nilsson, Lund (SE); Jonas Nilsson, Bunkeflostrand (SE); Mattias Darmell, Malmö (SE); Staffan Lindèn, Klippan (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 316 days.

(21) Appl. No.: 16/646,967

(22) PCT Filed: Sep. 7, 2018

(86) PCT No.: PCT/EP2018/074175
§ 371 (c)(1),
(2) Date: Mar. 12, 2020

(87) PCT Pub. No.: WO2019/052923
PCT Pub. Date: Mar. 21, 2019

(65) Prior Publication Data
US 2020/0207498 A1    Jul. 2, 2020

(30) Foreign Application Priority Data
Sep. 15, 2017   (EP) .................................. 17191306

(51) Int. Cl.
*B65B 51/30* (2006.01)
*B29C 65/02* (2006.01)
(Continued)

(52) U.S. Cl.
CPC .............. *B65B 51/30* (2013.01); *B29C 65/02* (2013.01); *B29C 66/1122* (2013.01);
(Continued)

(58) Field of Classification Search
CPC ..... B65B 51/30; B29C 65/02; B29C 66/1122; B29C 66/4312; B29C 66/8226;
(Continued)

(56) References Cited

U.S. PATENT DOCUMENTS 5,702,044 A * 12/1997 Christmann ............ B65B 41/14
403/375
5,895,332 A *  4/1999 Olson .................... B65G 23/44
198/813

(Continued)

FOREIGN PATENT DOCUMENTS

AT   A395082 A   10/1989
CN   1205291 A    1/1999
(Continued)

OTHER PUBLICATIONS

Extended European Search Report issued in European Patent Application No. 17191306.4, dated Mar. 23, 2018, in 16 pages.
(Continued)

*Primary Examiner* — Gloria R Weeks
*Assistant Examiner* — Mobeen Ahmed
(74) *Attorney, Agent, or Firm* — Knobbe, Martens, Olson & Bear, LLP (57) ABSTRACT

A tensioning device for a chain driven jaw system in a package filling machine is disclosed. The chain driven jaw system has a fixed cam and a chain as a follower. The tensioning device comprises a chain tensioning element shaped and angled so to receive the chain on an outer surface thereof configured to be directed away from a center of the chain driven jaw system, wherein the chain tensioning element comprises a pivot connection, and wherein the chain tensioning element is configured to be integrated with the fixed cam at the pivot connection such that the chain tensioning element abuts the fixed cam at the pivot connec-
(Continued)

tion and can move to tension the chain. A chain driven jaw system and a related method is also disclosed.

19 Claims, 6 Drawing Sheets (51) Int. Cl.
  *B29C 65/00* (2006.01)
  *B65G 37/00* (2006.01)
  *B29L 31/00* (2006.01)
  *B65G 23/44* (2006.01)
(52) U.S. Cl.
  CPC ...... *B29C 66/4312* (2013.01); *B29C 66/8226* (2013.01); *B29C 66/83533* (2013.01); *B29C 66/849* (2013.01); *B29L 2031/7166* (2013.01); *B65G 23/44* (2013.01); *B65G 37/00* (2013.01)
(58) Field of Classification Search
  CPC ............ B29C 66/83533; B29C 66/849; B29L 2031/7166; B65G 23/44; B65G 37/00
  USPC ............................ 198/586, 587, 810.04, 814
  See application file for complete search history.

(56) References Cited

U.S. PATENT DOCUMENTS

| | | | |
|---|---|---|---|
| 6,035,604 A | 3/2000 | Gustafsson | |
| 6,035,615 A * | 3/2000 | Hansson | B29C 65/18 |
| | | | 53/551 |
| 6,325,200 B1 * | 12/2001 | Poppi | B65B 7/2807 |
| | | | 198/395 |
| 2008/0156617 A1 | 7/2008 | Wild et al. | |
| 2013/0139928 A1 * | 6/2013 | Brunee | B65B 43/46 |
| | | | 198/377.07 |
| 2014/0223858 A1 * | 8/2014 | Pedretti | B65G 47/244 |
| | | | 198/377.02 |
| 2016/0200519 A1 * | 7/2016 | Cerny | B65G 23/44 |
| | | | 198/813 |
| 2018/0170587 A1 * | 6/2018 | Catellani | B65B 43/10 |
| 2019/0063563 A1 * | 2/2019 | Ruchet | F16H 7/0838 |
| 2020/0207498 A1 | 7/2020 | Nilsson et al. | |

FOREIGN PATENT DOCUMENTS

| | | |
|---|---|---|
| CN | 1712311 A | 12/2005 |
| CN | 101181964 A | 5/2008 |
| CN | 101570251 A | 11/2009 |
| CN | 102574594 A | 7/2012 |
| CN | 105422767 | 3/2016 |
| CN | 209905708 U | 1/2020 |
| EP | 0887263 A1 | 12/1998 |
| EP | 0887264 A1 | 12/1998 |
| EP | 0887265 A1 | 12/1998 |
| EP | 0887269 A1 | 12/1998 |
| EP | 0887270 A1 | 12/1998 |
| EP | 0887273 A1 | 12/1998 |
| EP | 1092631 A1 | 4/2001 |
| EP | 1125847 A1 | 8/2001 |
| EP | 1234772 A1 | 8/2002 |
| EP | 1500594 A1 | 1/2005 |
| EP | 1655125 A1 | 5/2006 |
| EP | 1785355 A1 | 5/2007 |
| EP | 1832518 A1 | 9/2007 |
| EP | 2311738 A1 | 4/2011 |
| GB | 2108616 B | 12/1984 |
| JP | 2006-001648 A | 1/2006 |
| WO | WO 03/101837 A1 | 12/2003 |
| WO | WO 2007138372 A1 | 12/2007 |
| WO | WO 2011/045395 A1 | 4/2011 |

OTHER PUBLICATIONS

International Search Report and Written Opinion for International Application No. PCT/EP2018/074175, dated Nov. 27, 2018, in 18 pages.

* cited by examiner

TENSIONING DEVICE FOR A CHAIN DRIVEN JAW SYSTEM

CROSS-REFERENCE TO RELATED APPLICATIONS

This application is the U.S. National Phase under 35 U.S.C. § 371 of International Application PCT/EP2018/074175, filed Sep. 7, 2018, which claims priority to EP Application No. 17191306.4, filed Sep. 15, 2017, the entire contents of each of which are incorporated by reference herein and made a part of this specification.

TECHNICAL FIELD

The present disclosure relates to a tensioning device for a chain driven jaw system in a package filling machine and related method.

BACKGROUND

It is known that a chain in a chain driven system for a filling machine needs to be tensioned to keep rollers of jaws and counter-jaws in contact with cams for the jaws. One such arrangement is disclosed in EP0887269 disclosing, in relation to e.g. FIG. 2, that along portions P3, Q3, chains 15, 27 cooperate with respective pairs of tensioners 56 for tensioning the chains to ensure rollers 52, 53 of jaws 12 and counter-jaws 13 are maintained in contact with respective cams 50, 51. Each tensioner 56 comprises a movable shoe 57 hinged about a horizontal axis to a support fixed to wall 6 or 7. On the face facing away from wall 6 or 7, shoe 57 comprises two side by side rolling tracks 60, 61, which, by virtue of a spring 59, cooperate with respectively rollers 52 and 53 of jaws 12 or counter-jaws 13.

An issue with such arrangement as e.g. disclosed in EP0887269 is that the rollers that are driven by chains are exposed to a high degree of friction and hammering on the chains by the arrangement of the tensioners. Further, a workload for a servo motor driving the chains increases due to e.g. the increased friction, and the arrangement would also create extra wear on the fixed cam due to the impact force of the chains.

Hence, an improved tensioning device, jaw system, filling machine and method would be advantageous and in particular allowing for avoiding more of the above-mentioned problems and compromises, including providing for reducing the wear in a chain driven jaw system and reducing the workload on the associated motor drive.

SUMMARY

Accordingly, examples of the present invention preferably seek to mitigate, alleviate or eliminate one or more deficiencies, disadvantages or issues in the art, such as the above-identified, singly or in any combination by providing a device according to the appended patent claims.

According to a first aspect a tensioning device for a chain driven jaw system in a package filling machine is provided. The chain driven jaw system has a fixed cam and a chain as a follower. The tensioning device comprises a chain tensioning element shaped and angled so to receive the chain on an outer surface thereof configured to be directed away from a center of the chain driven jaw system, wherein the chain tensioning element comprises a pivot connection, and wherein the chain tensioning element is configured to be integrated with the fixed cam at the pivot connection such that the chain tensioning element abuts the fixed cam at the pivot connection and can move to tension the chain.

According to a second aspect a chain driven jaw system for a package filling machine is provided. The chain driven system comprises at least one fixed cam, a chain as a follower, and at least one tensioning device, wherein the tensioning device comprises, a chain tensioning element shaped and angled so to receive the chain on an outer surface directed away from a center of the chain driven jaw system, wherein the chain tensioning element comprises a pivot connection, and wherein the chain tensioning element is integrated with the fixed cam at the pivot connection such that the chain tensioning element abuts the fixed cam at the pivot connection and can move to tension the chain.

According to a third aspect a filling machine is provided comprising a chain driven jaw system according to the second aspect or a tensioning device according to the first aspect.

According to a fourth aspect a method is provided for tensioning a chain in a chain driven jaw system for a package filling machine having a cam and a chain as a follower. The method comprises providing a chain tensioning device comprising a chain tensioning element shaped and angled so to receive the chain on an outer surface directed away from a center of the chain driven jaw system, wherein the chain tensioning element is configured to be integrated with the fixed cam at a pivot connection such that the chain tensioning element abuts the fixed cam at the pivot connection and can move to tension the chain, and tensioning the chain with the tensioning device.

Further examples of the invention are defined in the dependent claims, wherein features for the second and third aspects of the disclosure are as for the first aspect mutatis mutandis.

Some examples of the disclosure provide for reduced wear in a chain driven jaw system.

Some examples of the disclosure provide for reduced workload on the motor drive of a chain driven jaw system.

Some examples of the disclosure provide for reducing the vibrations in a chain driven jaw system.

Some examples of the disclosure provide for a smoother motion of the chain in a chain driven jaw system.

Some examples of the disclosure provide for a more predictable and efficient maintenance schedule of a chain driven jaw system.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of will be apparent and elucidated from the following description of examples of the present invention, reference being made to the accompanying drawings, in which.

DETAILED DESCRIPTION

Specific examples of the invention will now be described with reference to the accompanying drawings. This invention may, however, be embodied in many different forms and should not be construed as limited to the examples set forth herein; rather, these examples are provided so that this disclosure will be thorough and complete, and will fully convey the scope of the invention to those skilled in the art. The terminology used in the detailed description of the examples illustrated in the accompanying drawings is not intended to be limiting of the invention. In the drawings, like numbers refer to like elements.

Figure 1A:
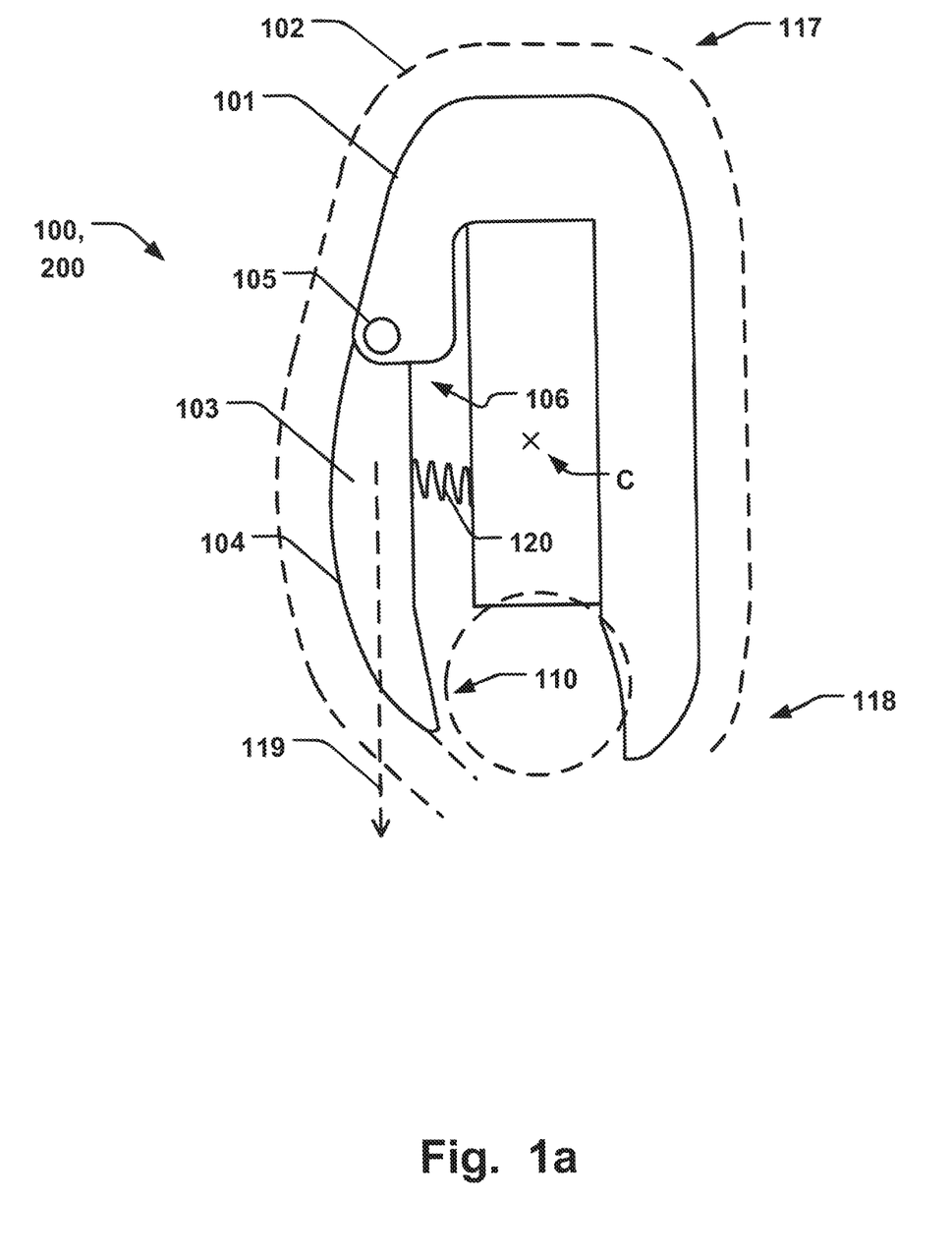
FIGS. 1a-b are schematic illustrations of a tensioning device and a chain driven jaw system according to examples of the disclosure.
Figure 2:
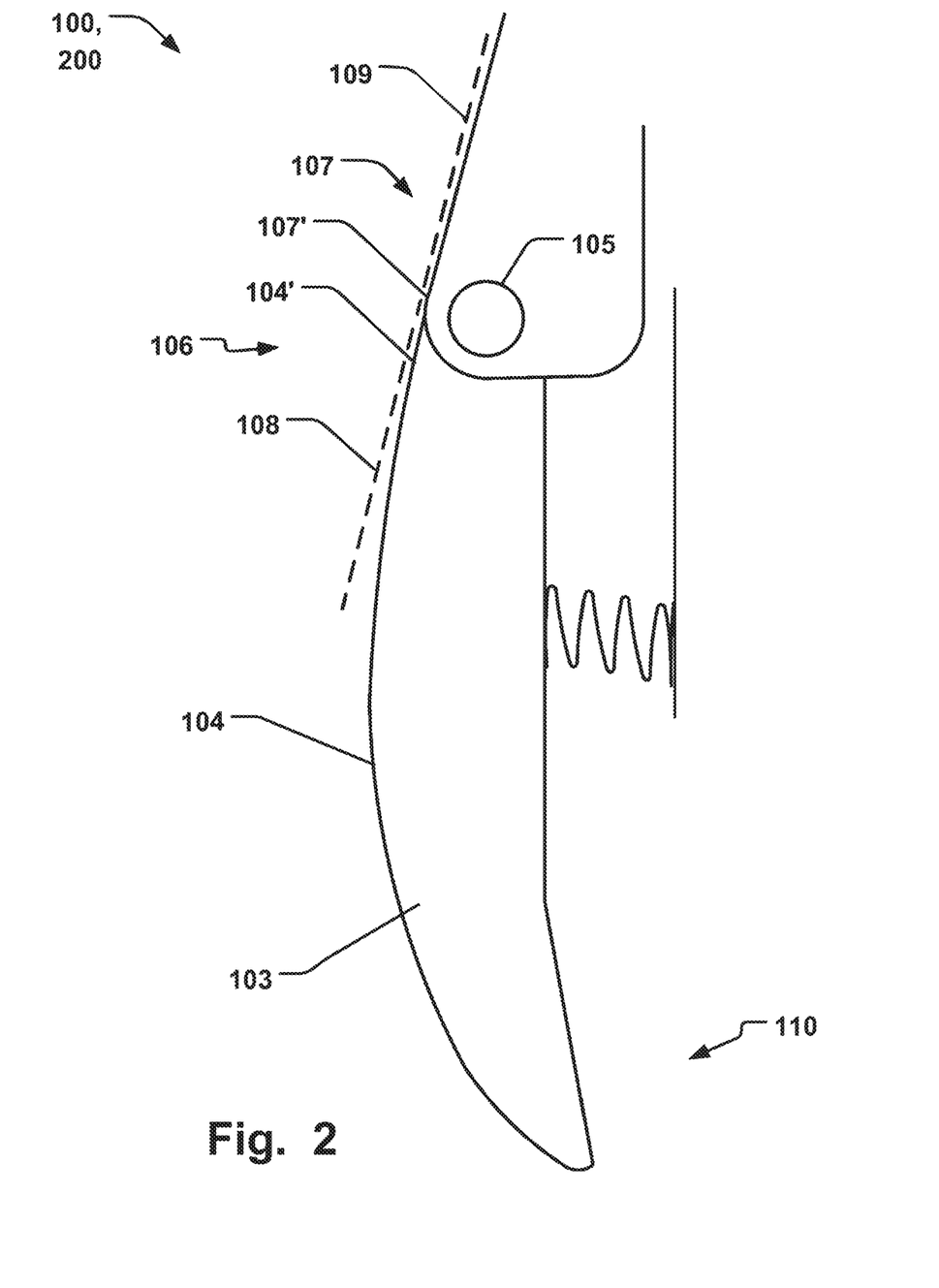
FIG. 2 is a schematic illustration of a tensioning device in a chain driven jaw system according to examples of the disclosure.
Figure 3:
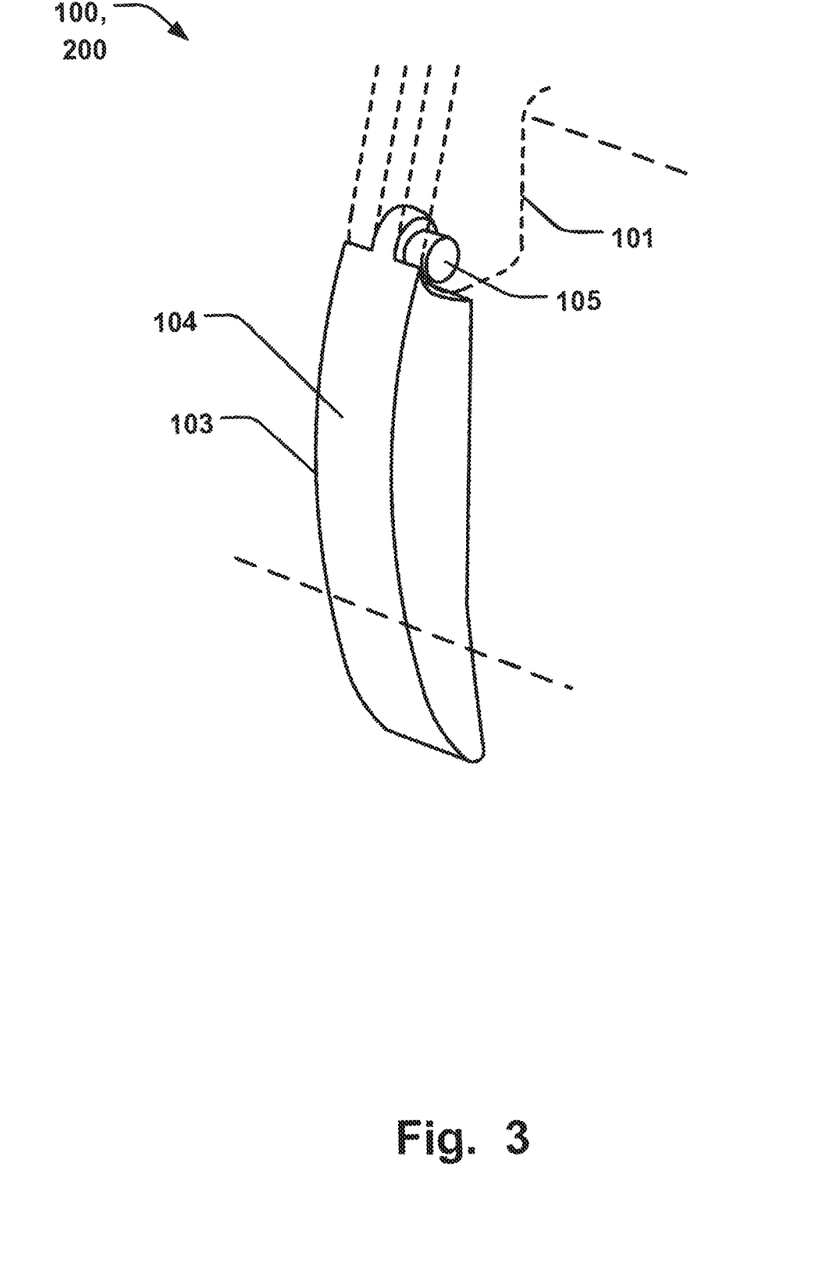
FIG. 3 is a schematic illustration, in a perspective view, of a tensioning device in a chain driven jaw system according to examples of the disclosure.

FIG. 1a is a schematic illustration of a tensioning device 100 for a chain driven jaw system 200 in a package filling machine. The chain driven jaw system 200 has a fixed cam 101 and a chain 102 as a follower. The fixed cam 101 has a curved outer track along which the chain 102 (indicated with dashed lines) is transported via rollers. The tensioning device 100 comprises a chain tensioning element 103 shaped and angled so to receive the chain 102 on an outer surface 104 thereof configured to be directed away from a center (C) of the chain driven jaw system 200. FIGS. 2 and 3 are schematic illustrations of the chain tensioning element 103 in a detailed side view and in a perspective view, respectively. The surface 104 is thus arranged to abut the chain 102 when transported along the outer track of the fixed cam 101. The chain tensioning element 103 comprises a pivot connection 105, around which the chain tensioning element 103 may pivot. The chain tensioning element 103 is configured to be integrated with the fixed cam 101 at the pivot connection 105 such that the chain tensioning element 103 abuts the fixed cam 101 at the pivot connection 105 and can move to tension the chain 102. By having the chain tensioning element 103 configured to be integrated with the fixed cam 101, i.e. in abutment with the fixed cam 101 at the pivot connection 105, the chain 102 can move smoothly onto the cam 101 from the chain tensioning element 103, while being sufficiently tensioned. In contrast, tensioning elements of prior art being separated from the cam, so that the associated chain forms an unsupported bridge between the chain tensioning element and the cam, create a more erratic and less controlled path of motion of the chain, which an increase risk of damaging vibrations and increased wear on the components. Thus, having the tensioning element 103 integrated with the fixed cam 101, allowing the outer surface 104 to transition directly to the outer track of the cam 101, provides for continuous support for the chain 102 and reduced vibrations and wear. The reduced vibrations provide also for decreasing the workload on the motor drive of the chain 102, and increased life time or longer service intervals, since the chain 102 will slide more smoothly and be less prone to hitting anything which otherwise may lead to unnecessary accelerations and/or decelerations of the motor.

As illustrated in e.g. FIGS. 1a and 2, the pivot point 105 may be integrated to the fixed cam 101 directly adjacent the outer track of the fixed cam 101, so that there will be a smooth transition between the chain tensioning element 103 and the outer track of the cam 101, as explained in more detail below.

The chain tensioning element 103 may have a curved outer surface 104 on which the chain 102 slides on, as shown in the example of e.g. FIG. 1a. Having a curved outer surface 104 allows the chain tensioning element 103 to follow the path of the chain 102 so that a minimum of resistance is introduced by the chain tensioning element 103, but at the same time gradually tensions the chain 102.

Turning to FIG. 2, the pivot connection 105 may be arranged at a first end 106 of the tensioning element 103. The outer surface 104 may extend to the first end 106 and the pivot connection 105 thereof, to form an outer pivot surface 104' of the chain tensioning element 103. As elucidated above, the outer pivot surface 104', at the first end 106, may be arranged to form a smooth direct transition to an outer cam surface 107' of a first portion 107 of the fixed cam 101 to which the chain tensioning element 103 is configured to be integrated, via the pivot connection 105. FIG. 2 schematically shows the outer pivot surface 104' arranged to form a smooth direct transition to the outer cam surface 107' of the first portion 107, providing for reducing the vibrations and wear of the chain 102, cam 101 and chain tensioning element 103 during operation. Accordingly, this also allows for the chain driven jaw system 200 to be operated at a higher speed, without risk of excessive wear, for increasing the throughput of the system 200 and filling machine (not shown) in which the tensioning device 100 and system 200 may be arranged.

A tangential line 108 of the outer pivot surface 104' may be configured to be aligned in parallel with a tangential line 109 of the outer cam surface 107' of the first portion 107, in at least one position of the chain tensioning element relative to the first portion 107, as schematically illustrated in FIG. 2. Such arrangement allows for a smooth transition between the outer pivot surface 104' outer cam surface 107', also when the tension, i.e. the angle of the chain tensioning element 103, is varied since it is conceivable that the tangential lines 108, 109, may be parallel in a default calibrated position, and only small variations in the mentioned angle may be needed to further adjust the tension.

The outer pivot surface 104' may be configured to form an uninterrupted transition to the outer cam surface 107' of the fixed cam 101 so that the chain 102 is continuously supported when bridged across the outer pivot surface 104' and the outer cam surface 107'. There may accordingly be no gaps between the outer pivot surface 104' and the outer cam surface 107', providing for improved support of the chain 102 and reduced risk of vibrations.

The chain tensioning element 103 may comprise a second end 110 ending freely, opposite the first end 106. The second end 110 may be configured to receive the chain 102 for subsequent guiding across the outer surface 104 to the first end 106. By having the second end 110 ending freely the chain 102 can slide onto the second end 110 more or less independent of how the chain 102 moves and then be guided into the correct position at the other first end 106 onto the cam 101 again.

The chain tensioning element 103 may comprise a spring 120 configured to push the chain tensioning element 103 outward from the center (C) of the chain driven jaw system 200. The spring 120 may be arranged adjacent the pivot connection 105 and the first portion 107 of the fixed cam 101 to which the chain tensioning element 103 is configured to be integrated. By having a spring 120 pushing the chain tensioning element 103 towards the chain 102, the chain 102 can be tensioned but at the same time the spring 120 allows for some flexibility in some force directions. Having the spring 120 configured to be arranged adjacent the pivot connection 105 and the first portion 107 of the fixed cam 101 provides for the benefits discussed above with the chain tensioning element 103 integrated with the first portion 107 while allowing for the mentioned tensioning. The spring 120 may be integrated with the pivot connection 105, providing for a tensioning device 100 with fewer components. Having the spring 120 connected between the first and second end 106, 110, it is possible to vary the effect of the spring 120 to optimize the tensioning.

Figure 4:
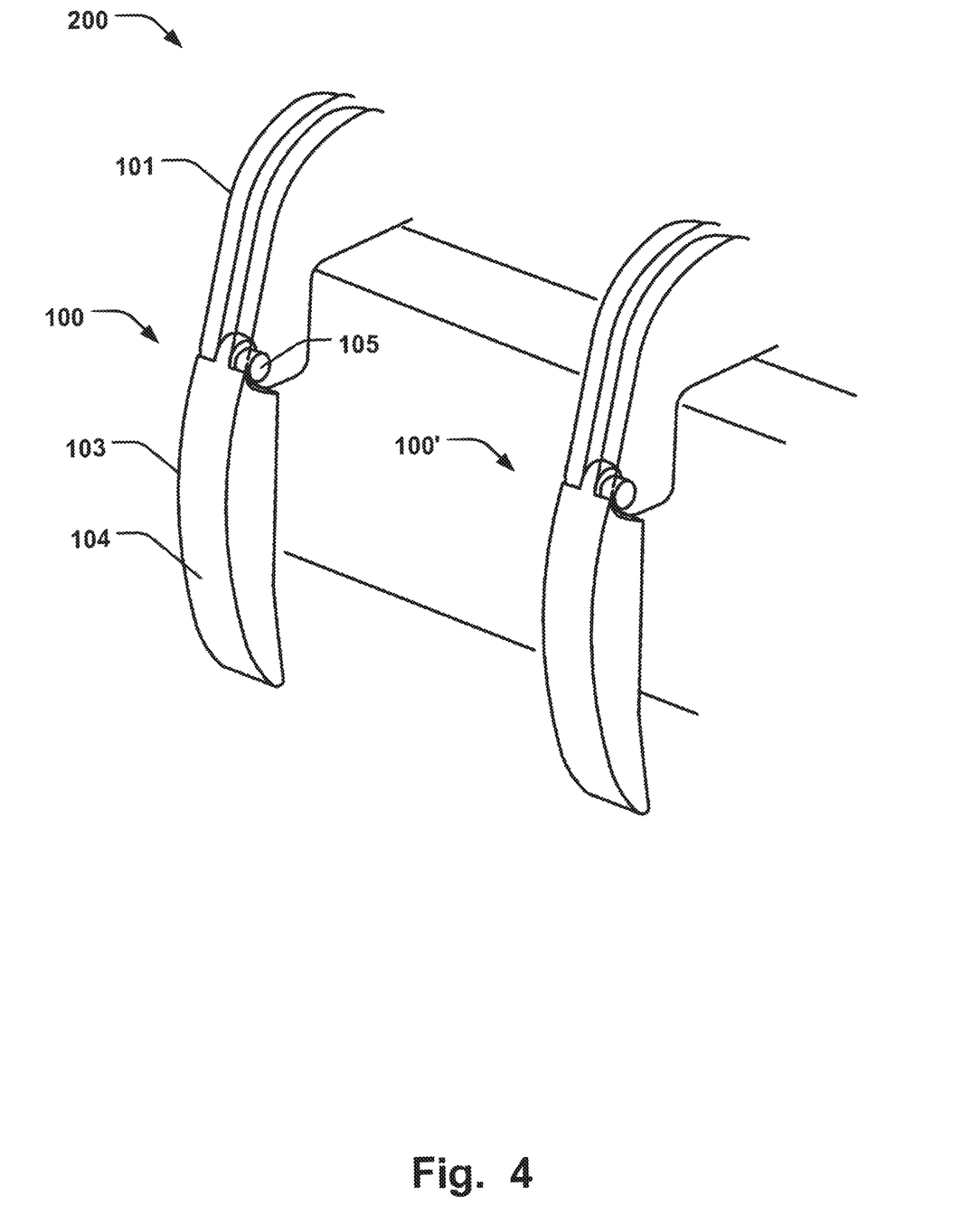
FIG. 4 is a schematic illustration, in a perspective view, of tensioning devices in a chain driven jaw system according to examples of the disclosure.

A chain driven jaw system 200 for a package filling machine is provided. The chain driven system 200 comprises at least one fixed cam 101 and chain 102 as a follower, as explained above. The chain driven jaw system 200 comprises at least one tensioning device 100, 100'. The tensioning device 100, 100', comprises a chain tensioning element 103 shaped and angled so to receive the chain on an outer surface 104 directed away from a center (C) of the chain driven jaw system 200. The chain tensioning element 103 comprises a pivot connection 105, and the chain tensioning element 103 is integrated with the fixed cam 101 at the pivot connection 105 such that the chain tensioning element 103 abuts the fixed cam 101 at the pivot connection 105 and can move to tension the chain 102. The chain driven jaw system 200 thus provides for the advantageous benefits as described above in relation to the tensioning device 100 and FIGS. 1-3. The chain driven jaw system 200 may comprise at least two tensioning devices 100, 100', arranged parallel to each other, as schematically illustrated in FIG. 4.

A chain driven jaw system 200 comprising at least two of the chain tensioning devices 100, 100', allows for a plurality of chains 102 to be run smoothly at the same time parallel to each other and allows for a more complex jaw system 200.

Figure 1B:
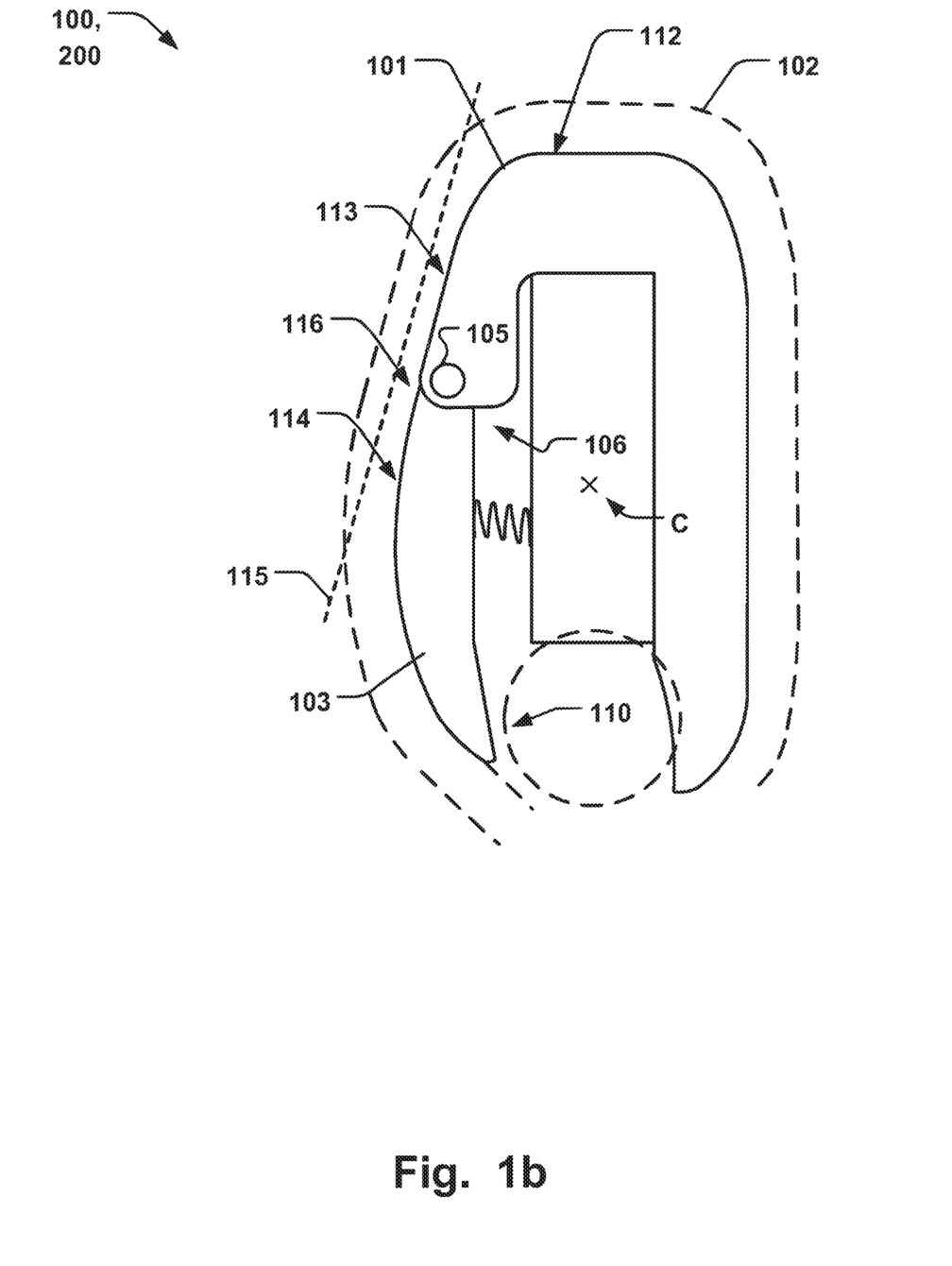

The chain driven jaw system 200 may comprise a path 112 along which the chain 102 is transported. The path 112 comprises a first section 113 along which the chain 102 is in abutment with the fixed cam 101, and a second section 114 along which the chain 102 is in abutment with the chain tensioning element 103, as schematically illustrated in FIG. 1b. I.e. the path 112 follows the outer surface or outer track of the fixed cam 101 and the chain tensioning element 103. The path 112 comprises a first longitudinal portion 115 comprising at least part of the first and second sections 113, 114, being substantially parallel and aligned end to end in the longitudinal direction, in at least one position of the chain tensioning element 103 relative to the first portion 107. Hence, the chain 102 may form a bridge portion 116 between the first and second sections 113, 114, along the first longitudinal portion 115 so that the bridge portion 116 extends across the pivot connection 105. Such arrangement allows for a smooth transition between the outer pivot surface 104' outer cam surface 107', also when the tension, i.e. the angle of the chain tensioning element 103, is varied since it is conceivable that the first and second sections 113, 114, may be parallel in a default calibrated position, and only small variations in the mentioned angle may be needed to further adjust the tension.

As explained, the pivot connection 105 may be arranged at a first end 106 of the chain tensioning element 103. The outer surface 104 may extends to the first end 106 and the pivot connection 105 thereof, to form an outer pivot surface 104' of the tensioning element 103. The outer pivot surface 104', at the first end 106, may be arranged to form a smooth transition to an outer cam surface 107' of a first portion 107 of the fixed cam 101 to which the chain tensioning element 103 is integrated, via the pivot connection 105.

And as further elucidated, a tangential line 108 of the outer pivot surface 104' may be aligned in parallel with a tangential line 109 of the outer cam surface 107' of the first portion 107, in at least one position of the tensioning element 103 relative to the first portion 107.

The first portion 107 of the fixed cam 101 may be arranged so that a distance between the first portion 107 and the center (C) of the chain driven jaw system 200 is shorter than a distance from the first portion 107 to the closest of the opposite ends 117, 118, of the chain driven jaw system 200 (see FIG. 1a), relative to the first portion 107, along a longitudinal direction 119 in which the chain tensioning element 103 extends. Thus, the first portion may be arranged adjacent, or closer to, the center (C) than any of the opposite ends 117, 118. Also, since the pivot connection 105 is integrated with the first portion 107, the same arrangement applies to the pivot connection 105, i.e. the pivot connection 105 may be arranged adjacent, or closer to, the center (C) than any of the opposite ends 117, 118. Since the chain tensioning element 103 is arranged to the fixed cam 101 at the pivot connection 105, at allows for the chain 102 to be supported along the full distance of the cam 101 between the opposite ends 117, 118, thereof, with no interruptions adjacent the center (C).

A filling machine (not shown) is provided comprising a chain driven jaw system 200 as described above in relation to FIGS. 1-4, and/or the filling machine comprises a tensioning device 100 as described above in relation to FIGS. 1-4. The filling machine thus provides for the advantageous benefits as described above in relation to the tensioning device 100 and the chain driven jaw system 200, and FIGS. 1-4. The filling machine may thus be operated with a reduced amount of vibrations and/or wear of its components, even at higher operating speeds.

Figure 5A:
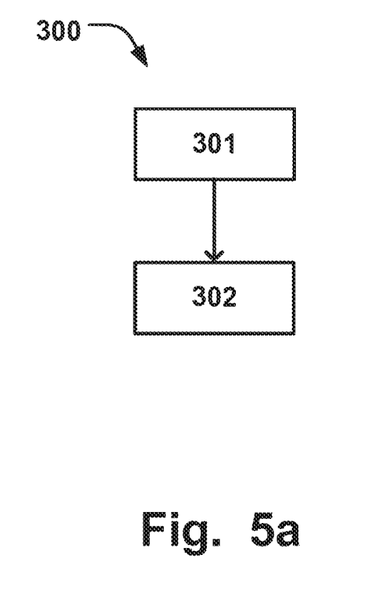
FIG. 5a is a flowchart of a method of tensioning a chain in a chain driven jaw system according to examples of the disclosure.

FIG. 5a illustrates a flow chart of a method 300 of tensioning a chain in a chain driven jaw system 200 for a package filling machine. The order in which the steps of the method 200 are described and illustrated should not be construed as limiting and it is conceivable that the steps can be performed in varying order. A method 200 is thus provided comprising providing 301 a tensioning device 100 comprising a chain tensioning element 103 shaped and angled so to receive the chain on an outer surface 104 directed away from a center (C) of the chain driven jaw system 200. The chain tensioning element 103 is configured to be integrated with the fixed cam 101 at a pivot connection 105 such that the chain tensioning element 103 abuts the fixed cam 101 at the pivot connection 105 and can move to tension the chain 102. The method 300 comprises tensioning 302 the chain 102 with the tensioning device 100. The method 300 thus provides for the advantageous benefits as described above in relation to the tensioning device 100 and the chain driven jaw system 200, and FIGS. 1-4. Thus, by using the tensioning device 100 the tension on the chain 102 can be guaranteed and at the same time a smoother transition from the chain tensioning element 103 on to the fixed cam 101 is provided.

Figure 5B:
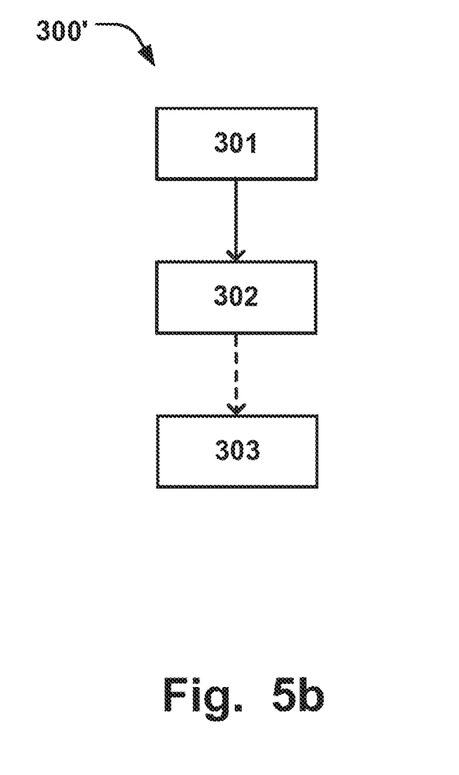
FIG. 5b is another flowchart of a method of tensioning a chain in a chain driven jaw system according to examples of the disclosure.

FIG. 5b illustrates a further flow chart of a method 300' of tensioning a chain 102 in a chain driven jaw system 200 for a package filling machine. The order in which the steps of the method 300' are described and illustrated should not be construed as limiting and it is conceivable that the steps can be performed in varying order. The method 300' may thus comprise the steps of the method 300 and also tensioning a plurality of chains 102 by using a plurality of tensioning devices 100, 100'.

The present invention has been described above with reference to specific examples. However, other examples than the above described are equally possible within the scope of the invention. The different features and steps of the invention may be combined in other combinations than those described. The scope of the invention is only limited by the appended patent claims.

More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

What is claimed is:

1. A tensioning device for a chain driven jaw system in a package filling machine, the chain driven jaw system comprising a fixed cam and a chain as a follower, the tensioning device comprising:
   a chain tensioning element shaped and angled so to receive the chain on an outer surface thereof configured to be directed away from a center of the chain driven jaw system,
   wherein the chain tensioning element comprises a pivot connection,
   wherein the chain tensioning element is configured to be integrated with the fixed cam at the pivot connection such that the chain tensioning element abuts the fixed cam at the pivot connection and can move to tension the chain, and
   wherein the pivot connection is configured to be positioned within the fixed cam at least partially on two sides of the pivot connection.

2. The tensioning device according to claim 1, wherein the pivot connection is arranged at a first end of the chain tensioning element, the outer surface extends to the first end and the pivot connection thereof, to form an outer pivot surface of the chain tensioning element, wherein the outer pivot surface, at the first end, is arranged to form a smooth direct transition to an outer cam surface of a first portion of the fixed cam to which the chain tensioning element is configured to be integrated, via the pivot connection.

3. The tensioning device according to claim 2, wherein a tangential line of the outer pivot surface is configured to be aligned in parallel with a tangential line of the outer cam surface of the first portion, in at least one position of the chain tensioning element relative to the first portion at the smooth direct transition.

4. The tensioning device according to claim 2, wherein the outer pivot surface is configured to form an uninterrupted transition to the outer cam surface of the fixed cam so that the chain is continuously supported when bridged across the outer pivot surface and the outer cam surface.

5. The tensioning device according to claim 2, wherein the chain tensioning element comprises a second end ending freely, opposite the first end, and wherein the second end is configured to receive the chain for subsequent guiding across the outer surface to the first end.

6. The tensioning device according to claim 2, wherein the chain tensioning element comprises a spring configured to push the chain tensioning element outward from the center of the chain driven jaw system, and wherein the spring is arranged adjacent the pivot connection and the first portion of the fixed cam to which the chain tensioning element is configured to be integrated.

7. A filling machine comprising the tensioning device according to claim 1.

8. The tensioning device according to claim 1, wherein the pivot connection comprises a pivot pin on one of the two sides of the pivot connection, the pivot pin configured to extend into the fixed cam.

9. The tensioning device according to claim 1, wherein the two sides of the pivot connection are opposite each other.

10. A chain driven jaw system for a package filling machine, the chain driven jaw system comprising:
    at least one tensioning device according to claim 1; and
    the fixed cam and the chain as the follower.

11. The chain driven jaw system according to claim 10, comprising a path along which the chain is transported, the path comprises a first section along which the chain is in abutment with the fixed cam, and a second section along which the chain is in abutment with the chain tensioning element,
    whereby the path comprises a first longitudinal portion comprising at least part of the first and second sections being substantially parallel, and
    whereby, where the chain forms a bridge portion between the first and second sections, along the first longitudinal portion, the bridge portion extends across the pivot connection.

12. The chain driven jaw system according to claim 10, wherein the pivot connection is arranged at a first end of the chain tensioning element, the outer surface extends to the first end and the pivot connection thereof, to form an outer pivot surface of the chain tensioning element, wherein the outer pivot surface, at the first end, is arranged to form a smooth transition to an outer cam surface of a first portion of the fixed cam to which the chain tensioning element is integrated, via the pivot connection.

13. The chain driven jaw system according to claim 12, wherein a tangential line of the outer pivot surface is aligned in parallel with a tangential line of the outer cam surface of the first portion, in at least one position of the chain tensioning element relative to the first portion.

14. The chain driven jaw system according to claim 12, wherein the first portion of the fixed cam is arranged so that a distance between the first portion and the center of the chain driven jaw system is shorter than a distance from the first portion to the closest of the opposite ends of the chain driven jaw system, relative to said first portion, along a longitudinal direction in which the chain tensioning element extends.

15. A filling machine comprising the chain driven jaw system according to claim 10.

16. A method of tensioning a chain in a chain driven jaw system for a package filling machine having a fixed cam and a chain as a follower, the method comprising:
    providing a chain tensioning device comprising a chain tensioning element shaped and angled so to receive the chain on an outer surface directed away from a center of the chain driven jaw system,
    wherein the chain tensioning element is configured to be integrated with the fixed cam at a pivot connection such that the chain tensioning element abuts the fixed cam at the pivot connection and can move to tension the chain;
    wherein the pivot connection is configured to be positioned within the fixed cam at least partially on two sides of the pivot connection and tensioning the chain with the chain tensioning device.

17. The method according to claim 16 comprising tensioning a plurality of chains by using a plurality of tensioning devices.

18. The method according to claim 16, wherein the pivot connection comprises a pivot pin on one of the two sides of the pivot connection, the pivot pin configured to extend into the fixed cam.

19. The method according to claim 16, wherein the two sides of the pivot connection are opposite each other.

* * * * *